United States Patent
Wang

(10) Patent No.: US 9,784,588 B2
(45) Date of Patent: Oct. 10, 2017

(54) NAVIGATION METHOD AND SYSTEM, MAP DATA MANAGEMENT CLOUD AND DATA UPDATE METHOD THEREOF

(71) Applicant: ZTE CORPORATION, Shenzhen, Guangdong Province (CN)

(72) Inventor: Haowen Wang, Shenzhen (CN)

(73) Assignee: XI'AN ZHONGXING NEW SOFTWARE CO., LTD., Xi'An, Shaanxi (CN)

(*) Notice: Subject to any disclaimer, the term of this patent is extended or adjusted under 35 U.S.C. 154(b) by 0 days.

(21) Appl. No.: 14/650,035

(22) PCT Filed: Jul. 23, 2013

(86) PCT No.: PCT/CN2013/079920
§ 371 (c)(1),
(2) Date: Jul. 2, 2015

(87) PCT Pub. No.: WO2013/182165
PCT Pub. Date: Dec. 12, 2013

(65) Prior Publication Data
US 2015/0345968 A1    Dec. 3, 2015

(30) Foreign Application Priority Data
Dec. 5, 2012    (CN) .......................... 2012 1 0516043

(51) Int. Cl.
*G01C 21/34* (2006.01)
*G01C 21/32* (2006.01)
(Continued)

(52) U.S. Cl.
CPC .......... *G01C 21/3453* (2013.01); *G01C 21/32* (2013.01); *G01C 21/3415* (2013.01);
(Continued)

(58) Field of Classification Search
CPC   G01C 21/3453; G01C 21/32; G01C 21/3415; G01C 21/3492; G01C 21/3605;
(Continued)

(56) References Cited

U.S. PATENT DOCUMENTS 6,381,535 B1     4/2002  Durocher et al.
8,965,695 B2 *   2/2015  Tzamaloukas ......... G01C 21/28
                                                    455/414.2
(Continued)

FOREIGN PATENT DOCUMENTS

CN        1963394 A       5/2007
CN      101017611 A       8/2007
(Continued)

OTHER PUBLICATIONS

EPO english translation of CN 102155951A.*
EPO english translation of CN 102376165A.*
EPO english translation of CN 101017611A.*

*Primary Examiner* — Yazan Soofi
(74) *Attorney, Agent, or Firm* — Ling Wu; Stephen Yang; Ling and Yang Intellectual Property

(57) ABSTRACT

A navigation method and system, a map data management cloud and data update method thereof, wherein the navigation method includes: a map data management cloud receiving a navigation request from a mobile terminal, wherein the navigation request includes: requesting for route information of the navigation; the map data management cloud obtaining an optimal route according to the navigation request and collected real-time route condition information; wherein the real-time route condition information includes: route condition information, uploaded by at least one mobile terminal, collected during navigation processes of the at least one mobile terminal; the map data management cloud sending the optimal route to the mobile terminal which (Continued)

sends the navigation request, thereby providing real-time navigation data and improving navigation efficiency.

11 Claims, 3 Drawing Sheets

(51) Int. Cl.
  *G01C 21/36* (2006.01)
  *G08G 1/0968* (2006.01)
  *G09B 29/00* (2006.01)
  *G09B 29/10* (2006.01)

(52) U.S. Cl.
  CPC ..... *G01C 21/3492* (2013.01); *G01C 21/3605* (2013.01); *G08G 1/096816* (2013.01); *G08G 1/096844* (2013.01); *G09B 29/003* (2013.01); *G09B 29/10* (2013.01)

(58) Field of Classification Search
  CPC . G08G 1/096816; G09B 29/003; G09B 29/10
  USPC .......................................................... 701/533
  See application file for complete search history.

(56) References Cited

U.S. PATENT DOCUMENTS

| 2001/0029425 | A1 | 10/2001 | Myr |
| 2003/0018428 | A1 | 1/2003 | Knockeart et al. |
| 2005/0256639 | A1 | 11/2005 | Aleksic et al. |
| 2008/0255754 | A1 | 10/2008 | Pinto |
| 2012/0253661 | A1* | 10/2012 | Tuukkanen ........ G01C 21/3492 701/423 |
| 2013/0282271 | A1* | 10/2013 | Rubin ..................... G08G 9/02 701/423 |
| 2014/0074392 | A1* | 3/2014 | Holm ................. G01C 21/3415 701/400 |

FOREIGN PATENT DOCUMENTS

| CN | 101063616 A | 10/2007 |
| CN | 101929864 A | 12/2010 |
| CN | 102155951 A | 8/2011 |
| CN | 102183258 A | 9/2011 |
| CN | 102376165 A | 3/2012 |
| CN | 102865876 A | 1/2013 |
| CN | 103017783 A | 4/2013 |
| KR | 20060002245 A | 1/2006 |

* cited by examiner

NAVIGATION METHOD AND SYSTEM, MAP DATA MANAGEMENT CLOUD AND DATA UPDATE METHOD THEREOF

TECHNICAL FIELD

The present document relates to the field of navigation technology, and more particularly, to a navigation method and system, a map data management cloud and a data update method thereof.

BACKGROUND OF THE RELATED ART

With the rapid development of society, people's activity space becomes bigger and bigger. The ensuing question is, when a person lives in an unknown area, because the user does not know the map environment in the location, lots of obstacles are generated. Aiming at such requirements, the navigation system came into being, and this kind of devices can help people quickly find out their places and plan the travel route.

But the existing navigation system has the following disadvantages:

on the one hand, the navigation result is based on offline local calculation and is restricted by the computation and storage capability of the terminal, and the local map data is relatively simple, and it is difficult to modify the map data. Therefore a lot of useful information generated in the actual use happen to be wasted. However, the map community based on location information sharing in the current network is facing the problem that information source is limited and it has to rely on artificial compilation ways to update the map data.

On the other hand, the map data is not updated in real time and cannot dynamically deal with special circumstances of the actual map location. First, the automation degree of the map data compilation process in the existing system is relatively low. For a relatively large area, such as a city, the data compilation workload is huge, and its update cycle may be several years. Modern urbanization, however, is rapid, and new road landmarks are emerging, and existing roads and landmarks are also changing. Therefore, because the current map information cannot be recognized, the destination location cannot be found, or even the planning route is unrealistic, the existing systems are often unable to meet the user needs. Secondly, due to the static map data model construction, the design of the existing systems does not take into account the actual road conditions, such as sudden congestion, temporary traffic control, or new implemented road traffic regulations and so on, thereby resulting in reduced usability of the existing systems.

SUMMARY OF THE INVENTION

To solve the main technical problem, the embodiment of the present invention is to provide a navigation method and system, a map data management cloud and a data update method thereof to avoid the problem that the navigation efficiency is poor because the navigation data cannot be provided in real time; to further solve the problem of long update cycle and poor real-time of offline map data, and also avoid the problem that a real-time offline map cannot be provided for the mobile terminal in time.

To solve the abovementioned technical problem, the technical solution used in the embodiment of the present invention is as follows:

A navigation method, comprising the following steps:

a map data management cloud receiving a navigation request from a mobile terminal, wherein the navigation request comprises: requesting for route information of navigation;

the map data management cloud obtaining an optimal route according to the navigation request and collected real-time route condition information; wherein the real-time route condition information comprises: route condition information, uploaded by at least one mobile terminal, collected in navigation processes of the at least one mobile terminal;

the map data management cloud sending an optimal route to the mobile terminal which sends the navigation request.

Alternatively, the navigation method further comprises the following steps:

the map data management cloud receiving an offline map data update request from the mobile terminal; wherein the offline map data update request comprises: current offline map identification information of the mobile terminal;

the map data management cloud detecting whether there is a new offline map or not according to the current offline map identification information of the mobile terminal, and if yes, sending an update notification to the mobile terminal.

Alternatively, the route information comprises: originating location information and destination location information.

Alternatively, the specific step of the map data management cloud obtaining the optimal route according to the navigation request and the collected real-time route condition information is: the map data management cloud obtaining all feasible route information stored therein according to the navigation request, and calculating the optimal route according the feasible route information and the real-time route condition information.

Alternatively, the navigation method further comprises the following steps:

the map data management cloud recalculating an optimal route from a current location of the mobile terminal to a destination location according to the received real-time route condition information, sent by at least one mobile terminal, collected in the navigation processes of the at least one mobile terminal, and sending an optimal route update notification to a corresponding mobile terminal if an updated optimal route exists.

The embodiment of the present invention further provides a data update method of map data management cloud, comprising the following steps:

a map data management cloud receiving route condition information, uploaded by at least one mobile terminal, collected during navigation processes of the at least one mobile terminal;

the map data management cloud collecting the received real-time route condition information;

the map data management cloud updating map data corresponding to the collected information.

Alternatively, the data update method of map data management cloud, wherein:

when the map data management cloud receives route condition information uploaded by a mobile terminal for the first time, taking a destination name to establish a data link according to destination information of the mobile terminal;

the map data management cloud completing navigation of the mobile terminal, and collecting route condition information corresponding to the mobile terminal into its corresponding data link;

the map data management cloud updating the map data according to the destination name in the data link.

Alternatively, after the map data management cloud collects route condition information corresponding to the terminal into its corresponding data link, if the map data stored therein does not have a destination address in the data link, establishes a new map location according to a new destination address and stores the data link.

The embodiment of the present invention further provides a navigation system, comprising a map data management cloud and at least one mobile terminal; the map data management cloud is configured to receive a navigation request from a mobile terminal, obtain an optimal route according to the navigation request and collected real-time route condition information; and send the optimal route to a corresponding mobile terminal which sends the navigation request; the navigation request comprises: requesting for route information of navigation; the real-time route condition information comprises: route condition information, uploaded by at least one mobile terminal, collected in navigation processes of the at least one mobile terminal.

Alternatively, the map data management cloud is further configured to receive an offline map data update request from the mobile terminal, and detect whether there is a new offline map or not according to current offline map identification information in an update request of the mobile terminal, and if yes, send an update notification to the mobile terminal.

Alternatively, the route information comprises: originating location information and destination location information.

Alternatively, the map data management cloud comprises: a data storage working node and a route planning working node; the route planning working node comprises: a sending module and a calculating module; the data storage working node comprises: a storing module and a query module;

the sending module is configured to send a query request to the query module;

the storing module is configured to store map data;

the query module is configured to inquire all feasible route information in the stored map data according to the origination and destination in the query request, and send the information to the calculating module;

the calculating module is configured to calculate an optimal route according to a query request generated according to the route information in the navigation request, the received feasible route information as well as the real-time route condition information.

Alternatively, the at least one mobile terminal is configured to collect route condition information collected during its own navigation process and upload the route condition information to the route planning working node; the at least one mobile terminal is further configured to, after receiving the update notification, download and update a current optimal route. The route planning working node further comprises a receiving module; the receiving module is configured to receive real-time route condition information sent by the at least one mobile terminal; the calculating module is further configured to recalculate an optimal route from a current location of the at least one mobile terminal to a destination location according to the timely uploaded real-time route condition information; the sending module is further configured to send an optimal route update notification to a corresponding mobile terminal.

The embodiment of the present invention further provides a map data management cloud, comprising: a data storage working node and a route planning working node; the route planning working node comprises a receiving module, a collecting module and a sending module; the receiving module is configured to receive real-time route condition information sent by at least one mobile terminal; the collecting module is configured to collect the received route condition information; the sending module is configured to send the collected information to the data storage working node; the data storage working node comprises: a storing module and an updating module; the storing module is configured to store map data; the updating module is configured to update the map data according to the collected information.

Alternatively, the collecting module is configured to, when receiving the route condition information uploaded by the mobile terminal for the first time, take a destination name to establish a data link according to its destination information, and after completing the navigation of the mobile terminal at the route planning working node, collect real-time route condition information corresponding to the mobile terminal into its corresponding data link; the updating module of the data storage working node is configured to update the map data according to the destination name in the data link.

Alternatively, the updating module is further configured to, when the stored map data does not have a destination address in the received data link, establish a new map location according to a new destination address, and send the data link to the storing module for storing.

The beneficial effects of the embodiments of the present invention are: providing a navigation method and system to calculate through the map data management cloud according to the user's navigation request and its collected real-time route condition information to obtain one optimal route, so that the mobile terminal of user can obtain one optimal navigation route in the real-time traffic, which improves the navigation usability and further improves the user experience.

Furthermore, in the navigation method and system in the embodiment of the present invention, the real-time route condition information of each mobile terminal is collected in real time during the navigation process, the optimal route from the current location of the mobile terminal to the destination location is recalculated, so that the user timely obtains the optimal navigation route of the current location according to the changes of the real-time traffic while traveling, which further enhances the navigation usability and navigation efficiency.

In the map data management cloud and the data update method thereof provided in the embodiment of the present invention, the real-time route condition information in the navigation process is collected and sent to the data storage working node, and the data storage working node timely calibrates and updates its stored map data to make the map information stored by the route planning working node more real-time and complete, and the map data can be updated according to the real-time changes of various traffics, so as to make all feasible route condition information downloaded by the route planning working node more comprehensive and improve the timeliness and completeness of the offline map downloaded by the mobile terminal.

PREFERRED EMBODIMENTS OF THE INVENTION

The embodiment of the present invention calculates the optimal route for the mobile terminal in real time via the cloud computing, during the navigation process, timely obtains the route condition information where respective mobile terminals are located from the respective mobile terminals, and timely determines the current optimal route for the mobile terminal by collecting and calculating the route condition information, so that the user's current travel route is the real-time optimal route. Furthermore, the timely obtained route condition information is used to timely update and proofread the map data stored in the cloud, so that the map data stored by the cloud is always the latest map data, thereby improving the frequency of updating the map data and providing users with more real-time and complete offline map data. In the embodiment of the present invention, the mentioned mobile is a terminal which can exchange data with the map data management cloud and also has a navigation function, such as a car navigation terminal, a smart phone, a tablet PC, and other mobile terminals. To make the technical solutions and advantages of the embodiments of the present invention more apparent, with reference to the accompanying figures, embodiments of the present invention will be described in further detail in the following.

Figure 1:
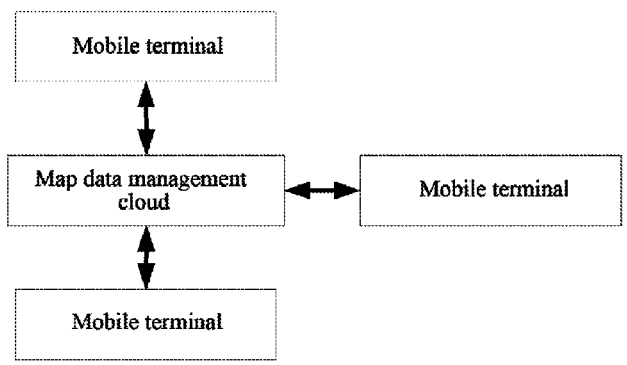
FIG. 1 is a schematic diagram of the structure of a navigation system in accordance with an embodiment of the present invention.

Please refer to FIG. 1, a navigation system is provided in the embodiment of the present invention, comprising: a map data management cloud and at least one mobile terminal (three mobile terminals are taken as an example in FIG. 1). Wherein the map data management cloud is primarily configured to store the map data, and provide the optimal route condition information for the mobile terminal according to the stored map data and the real-time collected route condition information, meanwhile the mobile terminal can also obtain its stored real-time offline map data from the map data management cloud, and update the offline map locally stored in the mobile terminal at anytime.

Figure 2:
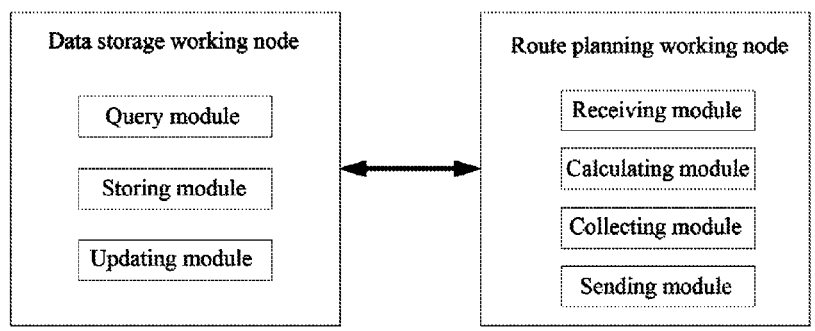
FIG. 2 is a schematic diagram of the structure of a map data management cloud in accordance with an embodiment of the present invention.

Refer to FIG. 2, the map data management cloud in the present embodiment further primarily comprises: a route planning working node and a data storage working node. Wherein the route planning working node is mainly configured to collect real-time route condition information of each mobile terminal, and calculate to provide real-time optimal route condition information for the mobile terminal; meanwhile collect and send the obtained route condition information to the data storage working node for storing. The data storage working node is mainly configured to store the map information, and update and proofread the stored map data according to the route condition information provided by the route planning working node, and provide more real-time offline map download for the user mobile terminal.

The route planning working node in the present embodiment further comprises: a receiving module, a calculating module, a collecting module and a sending module. The data storage working node further comprises: a query module, a storing module and an updating module. In the following, various modules in the route planning working node and the data storage working node in combination with the navigation method and data update method of map data management cloud provided in the embodiment of the present invention are used to describe the role of each module as well as the specific process of the navigation method and the data update method of map data management cloud in detail.

Figure 3:
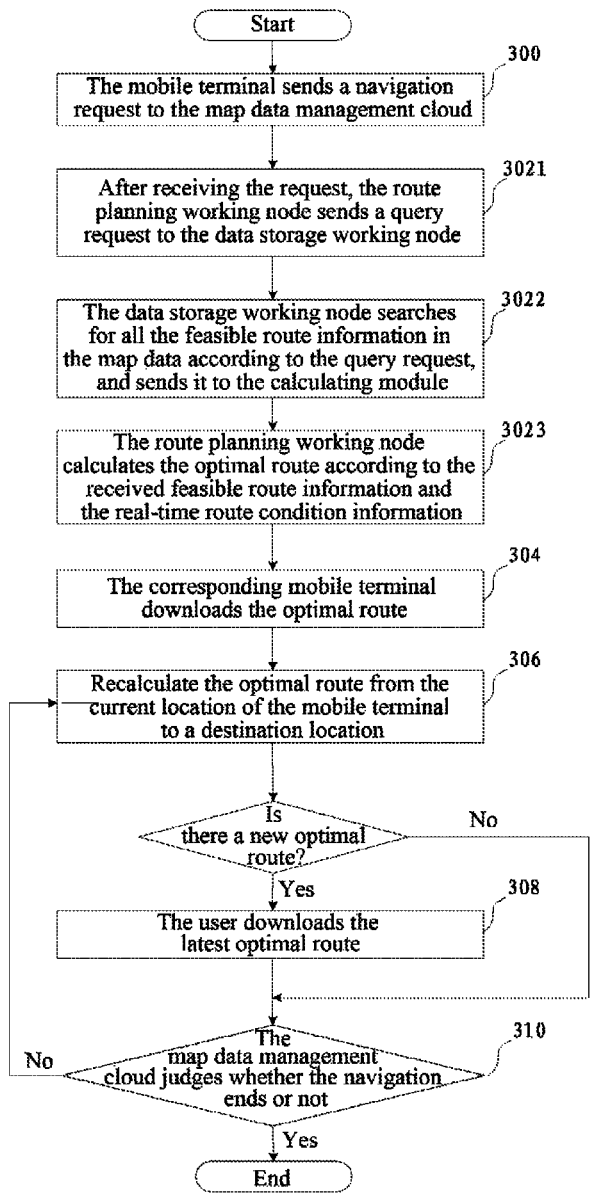
FIG. 3 is a flow chart of a navigation method in accordance with an embodiment of the present invention.

Refer to FIG. 3, the embodiment of the present invention further provides a navigation method which specifically comprises the following steps:

in step 300: the mobile terminal sends a navigation request to the map data management cloud, and it is to proceed to step 302;

In this step, the receiving module in the route planning working node in the map data management cloud is responsible for receiving a navigation request from the mobile terminal. The received navigation request comprises: requesting for route information of the navigation. Wherein, the route information may comprise information of the destination that the user needs to reach, and by default, the origination information is current location information of the user mobile terminal, and the current location information can be obtained by the mobile terminal through the positioning system and sent with the route information together at the same time; and also the map data management cloud initiatively positions the current location of the user mobile terminal. In the present embodiment, one kind of preferred route information may comprise: originating location information and destination location information, wherein the originating location information is the current location information of the abovementioned mobile terminal, or the user-defined location point; the destination location information is the destination address information where the user needs to reach. Furthermore, the route information may further comprise information of at least one key location point that the user needs to reach specially between the originating point and the destination point.

In step 302: the map data management cloud calculates to acquire the optimal route according to the navigation request and the collected real-time route condition information, proceeding to step 304;

in this step, it may further comprise the following specific steps:

in step 3021: the route planning working node sends a query request to the data storage working node. It is to proceed to step 3022;

in this step, the calculating module in the route planning working node generates a query request in accordance with the route information in the navigation request, and forwards it to the sending module, so that the sending module sends it to the query module in the data storage working node;

in step 3022: the query module in the data storage working node searches for all the feasible route information in the stored map data according to the origination and destination in the query request, and sends it to the calculating module. It is to proceed to step 3023;

in this step, after receiving the query request, the query module in the data storage working node obtains the related map data according to its requested origination and destination information, and searches for all feasible route information therein, and sends it to the calculating module in the route planning working node.

In step 3023: the route planning working node calculates the optimal route according to the received feasible route information and the real-time route condition information. It is to proceed to step 304;

In this step, at least one mobile terminal collects the route condition information collected during their own navigation processes and uploads the information to the route planning working node. The at least one mobile terminal referred herein refers to mobile terminals that exchange information with the map data management cloud, and they may send the route condition information collected in their traveling processes to the receiving module in the route planning working node. After receiving all the feasible route information sent by the query module, the calculating module in the route planning working node obtains route condition information of the corresponding location received by the receiving module, and calculates all the routes to determine an optimal route.

In step 304: the corresponding mobile terminal downloads the optimal route. It is to proceed to step 306;

In this step, in order to operate more user-friendly, it may send an optimal route download notification to the corresponding mobile terminal before the step, and let the mobile terminal choose whether to download or not.

In step 306: the map data management cloud recalculates the optimal route from the current location of the mobile terminal to a destination location according to the received real-time route condition information sent by the at least one mobile terminal; if there exists an optimal route, it is to proceed to step 308, if the optimal route is not updated, then it is to proceed to step 310;

in this step, to make the user's navigation efficiency higher and the obtained navigation information more real-time, correspondingly the route planning working node recalculates the user's travel route according to the real-time route condition information, sent by the at least one mobile terminal, received by the receiving module to obtain a real-time optimal route. In the present embodiment, preferably, the route condition information collected by the mobile terminal comprises: the moving speed of mobile terminal, the route clear state, turning rules, road coordinates, road name, the number and size of parallel lanes and so on. Hereinafter, a particular case will be listed to describe the step: after a mobile terminal sends the navigation request, the optimal route initially planned by the route planning working node for the mobile terminal is: A-B-C-D-E-F, but in the process of the user moving in the segment A-B, the route planning working node knows from the further obtained route condition information that, the segment B-C of the road is congested and the segment D-E is impassable due to road construction, and the calculating module re-calculates an optimal route for the user, and the calculated optimal route is: A-B-G-D-H-F.

In step 308: the mobile terminal downloads the latest optimal route. It is to proceed to step 310;

similarly in this step, in order to operate more user-friendly, it may send an optimal route download notification to the corresponding mobile terminal before this step to let the mobile terminal choose whether to download or not.

In step 310, the map data management cloud judges whether the navigation ends or not, if no, it is to proceed to step 306; if yes, the navigation ends.

The navigation method in the present embodiment, in any step thereof, may further comprise the following steps: the map data management cloud receives an offline map data update request from the mobile terminal; the offline map data update request comprises: the current offline map identification information of the mobile terminal; the map data management cloud detects whether there is a new offline map or not according to the current offline map identification information of the mobile terminal, and if yes, it sends an update notification to the mobile terminal; the mobile terminal downloads the new version of offline map and updates the locally stored offline map.

In this step, the mobile terminal may update its stored offline map as needed, it needs to send an update request to the data storage working node, and the update request mainly comprises identification information of the offline map stored by the user mobile terminal, and the identification information specifically can be: version information of the offline map stored by the mobile terminal, information of the area required to be updated or the map information of current location of the mobile terminal and so on. By taking the identification information as the version information of the offline map for example, after receiving the update request, the data storage working node compares whether the version information of the user's offline map is the same as the version information of the locally stored offline map or not, and if no, it notifies the corresponding mobile terminal to download the latest version of offline map, if yes, then it notifies the user that an update is not needed. If the identification information is the map information of current location of the mobile terminal, after receiving the update request, the data storage working node compares whether the identification information such as the identifications of various buildings or road information in the map information of user's current location is the same as the corresponding information in its locally stored offline map or not, if no, it notifies the corresponding mobile terminal to download the latest version of offline map, if yes, then it notifies the user that an update is not needed.

Figure 4:
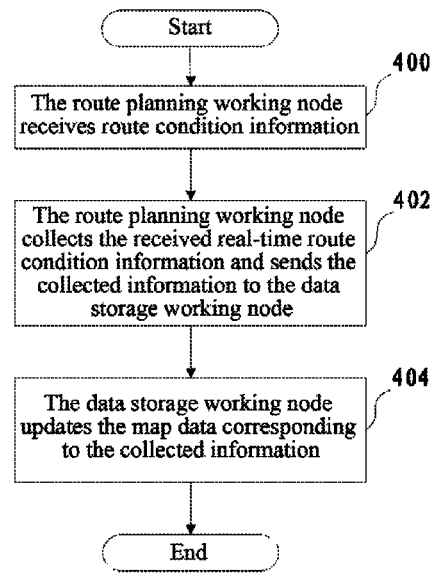
FIG. 4 is a flow chart of a data update method of map data management cloud in accordance with an embodiment of the present invention.

Please refer to FIG. 4, the embodiment of the present invention further provides a data update method of map data management cloud, which specifically comprises the following steps:

in step 400: the route planning working node receives route condition information, uploaded by at least one mobile terminal, collected in the navigation processes of the at least one mobile terminal. It is to proceed to step 402;

In this step, preferably, the route condition information uploaded by the mobile terminal can be: the moving speed of mobile terminal, the route clear state, turning rules, road coordinates, road name, the number and size of parallel lanes and so on. The receiving module in the route planning working node is responsible for receiving the route condition information.

In step 402: the route planning working node collects the received real-time route condition information and sends the collected information to the data storage working node. It is to proceed to step 404;

in this process, the collecting module in the route planning working node requires to collect route condition information received by the receiving module, in the collecting process, the collecting module can collect the overall route condition information of one navigation route, or individually collect route condition information of several segments of a complete navigation route. During the sending process, for the timeliness of data transmission, the collected information of the various segments is promptly uploaded to the data storage working node; preferably, in the present embodiment, in order to save network resources, after completing one navigation route, the collecting module collects and sends the route condition information of the entire navigation route to the data storage working node. In the present embodiment, when the route planning working node receives route condition information of a certain destination address for the first time, a data link is established according to the destination address in the route condition information uploaded by the mobile terminal, and thereafter the uploaded route condition information with the destination address is collected into the data link.

In step 404: the data storage working node updates the map data corresponding to the collected information.

In this step, when the updating module in the data storage working node receives the collected route condition information sent by the collecting module, the map data stored in the storage module is updated and proofread according to the location corresponding to the route condition information. Preferably, what is uploaded by the collecting module is a data link with destination information, and the updating module searches for the corresponding location in the map data and updates it according to the destination location, but if the map data does not have the destination address, the updating module establishes a new map location at the corresponding location in the map data, and stores the route condition information in the data link into the corresponding location.

In the present embodiment, because the map data stored in the data storage working node is updated and proofread in real-time, it can ensure that the more real-time and complete map data can be obtained when the user downloads a real-time map or an offline map.

The above content is a further detailed description of the present document with reference to the specific embodiments, and the specific implementation of the present document cannot be considered as being limited to the description. For a person ordinarily skilled in the art of the present document, a number of simple deductions or replacements can also be made without departing from the concept of the present document and should be considered as belonging to the protection scope of the present document.

INDUSTRIAL APPLICABILITY

In the map data management cloud and the data update method thereof provided in the embodiment of the present invention, the real-time route condition information in the navigation process is collected and sent to the data storage working node, and the data storage working node timely calibrates and updates its stored map data to make the map information stored by the route planning working node more real-time and complete, and the map data can be updated according to the real-time changes of various traffics, so as to make all feasible route condition information downloaded by the route planning working node more comprehensive and improve the timeliness and completeness of the offline map downloaded by the mobile terminal.

What is claimed is:

1. A navigation method, comprising following steps:
a first mobile terminal sending a navigation request to a map data management cloud server, wherein the navigation request comprises: requesting for route information of navigation;
after receiving the navigation request, the map data management cloud server searching for all feasible routes according to the route information in the navigation request;
at least one second mobile terminal collecting real-time route condition information during its own navigation process, and uploading the real-time route condition information to the map data management cloud server;
the map data management cloud server calculating an optimal route according to the all feasible route sand the received real-time route condition information;
the map data management cloud server sending an optimal route download notification to the first mobile terminal; and
the first mobile terminal downloading the optimal route according to the optimal route download notification;

the method further comprising:
the second mobile terminal uploading the real-time route condition information to the map data management cloud server for the first time,
after receiving the real-time route condition information, the map data management cloud server establishing a data link by a destination name according to destination information in the real-time route condition information uploaded by the second mobile terminal,
the map data management cloud server collecting route condition information uploaded by any mobile terminal into the data link corresponding to the same destination name in the route condition information uploaded by any mobile terminal,
the map data management cloud server updating map data by storing the route condition information in the data link into corresponding location,
a mobile terminal, which can be the first mobile terminal, the second mobile terminal, or any other mobile terminal, sending an update request to the map data management cloud server for updating an offline map, wherein the update request comprises: current offline map identification information of the mobile terminal,
the map data management cloud server, after receiving the update request, comparing whether the current offline map identification information of the mobile terminal is the same as offline map identification information of the locally stored offline map or not, and if no, notifying the mobile terminal to download a latest version of the offline map, and
the mobile terminal downloading the latest version of the offline map.

2. The navigation method of claim 1, wherein the route information comprises:
originating location information and destination location information.

3. The navigation method of claim 1, further comprising following steps:
the map data management cloud server recalculating another optimal route from a current location of the first mobile terminal to a destination location preset by the first mobile terminal according to the received real-time route condition information which is sent timely by the at least one second mobile terminal, and sending an optimal route update notification to the first mobile terminal if said another optimal route is different from the previous optimal route;
the first mobile terminal receiving the optimal route update notification and downloading said another optimal route according to the optimal route update notification.

4. A data update method of map data management cloud server, comprising following steps:
at least one mobile terminal collecting real-time route condition information during its own navigation process, and uploading the real-time route condition information to a map data management cloud server;
the map data management cloud server receiving the real-time route condition information;
the map data management cloud server collecting the received real-time route condition information;
the map data management cloud server updating map data corresponding to the collected real-time route condition information;
wherein the method further comprises:
the at least one mobile terminal uploading the real-time route condition information to the map data management cloud server for the first time, after receiving the real-time route condition information, the map data management cloud server establishing a data link by a destination name according to destination information in the real-time route condition information uploaded by the at least one mobile terminal;

the map data management cloud server collecting route condition information uploaded by any mobile terminal into the data link corresponding to the same destination name in the route condition information uploaded by any mobile terminal;

the map data management cloud server updating the map data by storing the route condition information in the data link into corresponding location, a mobile terminal, which can be the at least one mobile terminal, or any other mobile terminal, sending an update request to the map data management cloud server for updating an offline map, wherein the update request comprises: current offline map identification information of the mobile terminal, the map data management cloud server, after receiving the update request, comparing whether the current offline map identification information of the mobile terminal is the same as offline map identification information of the locally stored offline map or not, and if no, notifying the mobile terminal to download a latest version of the offline map, and the mobile terminal downloading the latest version of the offline map.

5. The data update method of map data management cloud server of claim 4, further comprising, after the map data management cloud server collects route condition information corresponding to the terminal into the data link corresponding to the route condition information, if map data stored therein does not have a destination address in the data link, establishing a new map location according to a new destination address and storing the data link.

6. A navigation system, comprising a map data management cloud server, and a plurality of mobile terminals interacting with the map data management cloud server and including a first mobile terminal, at least one second mobile terminal, and any other mobile terminals; wherein, the first mobile terminal is configured to send a navigation request to a map data management cloud server, wherein the navigation request comprises: requesting for route information of navigation;

the map data management cloud server is configured to, after receiving the navigation request, search for all feasible routes according to the route information in the navigation request;

the at least one second mobile terminal is configured to collect real-time route condition information during its own navigation process, and upload the real-time route condition information to the map data management cloud server;

the map data management cloud server is further configured tocalculate an optimal route according to the all feasible routes and the received real-time route condition information; and send an optimal route download notification to the first mobile terminal;

the first mobile terminal is further configured to download the optimal route according to the optimal route download notification; and wherein, the second mobile terminal is further configured to upload the real-time route condition information to the map data management cloud server for the first time, the map data management cloud server is further configured to:

after receiving the real-time route condition information establish a data link by a destination name according to destination information in the real-time route condition information uploaded by the second mobile terminal, collect route condition information uploaded by any mobile terminal into the data link corresponding to the same destination name in the route condition information uploaded by any mobile terminal, update map data by storing the route condition information in the data link into corresponding location, one of the plurality of mobile terminals, which can be the first mobile terminal, the second mobile terminal, or any other mobile terminal, is configured to send an update request to the map data management cloud server for updating an offline map, wherein the update request comprises: current offline map identification information of the mobile terminal, the map data management cloud server is further configured to after receiving the update request, compare whether the current offline map identification information of the mobile terminal is the same as offline map identification information of the locally stored offline map or not, and if no, notify the one mobile terminal to download a latest version of the offline map, and the one mobile terminal is further configured to download the latest version of the offline map.

7. The navigation system of claim 6, wherein the route information comprises: originating location information and destination location information.

8. The navigation system of claim 7, wherein the map data management cloud server comprises: a data storage working node and a route planning working node; the route planning working node comprises: a sending module and a calculating module; the data storage working node comprises: a storing module and a query module;

the sending module is configured to send a query request generated according to the route information in the navigation request to the query module;

the storing module is configured to store map data;

the query module is configured to inquire all feasible route information in the stored map data according to origination and destination in the query request, and send the all feasible route information to the calculating module;

the calculating module is configured to calculate an optimal route according to the query request, the received feasible route information as well as the real-time route condition information.

9. The navigation system of claim 8, wherein the at least one second mobile terminal is configured to collect the real-time route condition information during the navigation process of the at least one second mobile terminal, and upload the real-time route condition information to the route planning working node timely;

the route planning working node further comprises a receiving module, the receiving module is configured to receive the real-time route condition information sent by the at least one second mobile terminal;

the calculating module is further configured to recalculate another optimal route from a current location of the first mobile terminal to a destination location preset by the first mobile terminal according to the timely uploaded real-time route condition information;

the sending module is further configured to send an optimal route update notification to the first mobile terminal;

the first mobile terminal is further configured to, after receiving the optimal route update notification, download and update a current optimal route to said another optimal route.

10. A map data management cloud server, comprising: a data storage working node and a route planning working node;

wherein the route planning working node comprises a receiving module, a collecting module and a sending module, the data storage working node comprises: a storing module and an updating module;

the receiving module is configured to receive real-time route condition information collected and uploaded by at least one mobile terminal during its own navigation process;

the collecting module is configured to collect the received real-time route condition information;

the sending module is configured to send the collected real-time route condition information to the data storage working node; and the storing module is configured to store map data;

the updating module is configured to update the map data according to the collected real-time route condition information;

wherein, the collecting module is further configured to, after receiving the real-time route condition information uploaded by the at least one mobile terminal for the first time, establish a data link by a destination name according to destination information in the real-time route condition information uploaded by the at least one mobile terminal, and collect route condition information uploaded by any mobile terminal into the data link corresponding to the same destination name in the route condition information uploaded by any mobile terminal;

the updating module of the data storage working node is further configured to update the map data by storing the route condition information in the data link into corresponding location;

the sending module is further configured to compare whether current offline map identification information of a mobile terminal is the same as offline map identification information of the locally stored offline map or not, and if no, notify the mobile terminal which sends an update request for updating an offline map to download a latest version of the offline map, wherein the update request comprises: the current offline map identification information of the mobile terminal.

11. The map data management cloud server of claim 10, wherein the updating module is further configured to, when stored map data does not have a destination address in a received data link, establish a new map location according to a new destination address, and send the data link to the storing module for storing.

* * * * *